United States Patent [19]

Leasor et al.

[11] 4,217,074

[45] Aug. 12, 1980

[54] SLIP SHEET LIFT TRUCK

[75] Inventors: Paul J. Leasor, St. Marys; Gerald S. Pulskamp; Harold A. Stammen, both of Bremen, Ohio

[73] Assignee: Crown Controls Corporation, New Bremen, Ohio

[21] Appl. No.: 914,622

[22] Filed: Jun. 9, 1978

[51] Int. Cl.[2] .......... B60P 1/34

[52] U.S. Cl. .......... 414/642; 414/661

[58] Field of Search .......... 414/492, 493, 619, 622, 414/639-642, 661; 280/43.12

[56] References Cited

U.S. PATENT DOCUMENTS

| | | | |
|---|---|---|---|
| 2,427,301 | 9/1947 | Puim | 414/642 |
| 2,576,482 | 11/1951 | Rydner | 414/661 |
| 2,583,977 | 1/1952 | Turner | 414/661 |
| 2,590,355 | 3/1952 | Turner | 414/661 |
| 2,601,932 | 7/1952 | Turner | 414/661 |
| 2,608,315 | 8/1952 | Turner | 414/641 |
| 2,616,578 | 11/1952 | Dunham | 414/516 |
| 2,672,249 | 3/1954 | Ulinski | 414/661 |
| 2,727,643 | 12/1955 | Maginn | 414/661 |
| 2,787,393 | 4/1957 | Horton | 414/661 |
| 2,955,721 | 10/1960 | Hepler | 414/661 |
| 2,996,204 | 8/1961 | Jensen | 414/661 |
| 3,142,399 | 7/1964 | Oster | 414/661 |
| 3,197,053 | 7/1965 | Faust | 414/661 |
| 3,289,872 | 12/1966 | Peratoner | 414/642 |
| 3,392,858 | 7/1968 | Fernstrom | 414/639 X |
| 3,495,730 | 2/1970 | Rigsby | 414/475 |
| 3,516,641 | 6/1970 | Ferguson | 414/661 X |
| 3,532,239 | 10/1970 | May | 414/642 |
| 3,640,414 | 2/1972 | Brudi | 414/661 |
| 3,666,128 | 5/1972 | Shimizu | 414/661 |
| 4,037,744 | 7/1977 | Nagin, Jr. | 414/497 |
| 4,065,012 | 12/1977 | Rocco | 414/641 X |

OTHER PUBLICATIONS

Otis, "Moto-Truc" MTP-WJ, Specification Sheet.
Clark, HWP30P, Specification Sheet.

*Primary Examiner*—Robert G. Sheridan
*Assistant Examiner*—Terrance L. Siemens
*Attorney, Agent, or Firm*—Biebel, French & Nauman

[57] ABSTRACT

The lifting mast (20), frame (12), and outriggers (16) of a slip sheet lift truck (10) are fixed and immovable with respect to one another. The platen (30), push-pull mechanism (45), and back plate (31) are an integral unit mounted to permit side shifting on a tilt carriage (29), which is mounted on lower pivots (28) and tiltable thereabout with upper tilt cylinders (35). These are carried on a lifting carriage (25) which is vertically moveable and supported by a lifting cylinder (26) on the lifting mast (20). The lift truck outriggers (16) extend and slope forwardly and downwardly from the mast (20) to provide better truck stability, clearance for the platen (30), and good underclearance for ramps and dockboards.

8 Claims, 3 Drawing Figures

SLIP SHEET LIFT TRUCK

BACKGROUND OF THE INVENTION

This invention relates to lift trucks, and more particularly to "slip sheet" lift trucks in which loads are carried on sheets rather than pallets. Lift trucks of this type include push-pull mechanism which clamp onto a load-bearing sheet and pull the sheet onto a load carrying platform or platen at the front of the truck. For loading purposes the platen is tilted downwardly to a ground engaging position. When the load is to be unloaded, the push-pull mechanism pushes the load off the platen. U.S. Pat. No. 3,640,414 shows a typical mechanism of this type.

A continuing design problem with slip sheet lift trucks has been providing for pulling the sheet onto the platen at ground level. Unlike forklift trucks which handle palletized loads, and in which it is necessary only to get the forks low enough to slide into the pallets, in the present invention the forward end of the platen must go directly to the floor.

The prior art shows a number of devices of this general type. One type, for example, uses a lifting mast which is forwardly tilttable, so that the platen that extends therefrom can be tilted downwardly to a ground engaging loading position. However, when tilting a mast with a load in an elevated position, the center of gravity of the load and the mast moves, causing a substantial change in truck stability. Forward mast tilt causes substantial reduction of forward stability. Rearward mast tilt causes substantial reduction of lateral stability on trucks with three point suspension or narrow rear wheel spread. Also, tilting of the mast requires structural clearance which adds to the length of the truck. Further, tilting the mast with the platen or fork height above or below the mast tilt axis causes the platen or forks to move horizontally, and the truck must then be repositioned forward or reverse to maintain the same platen or fork position. Furthermore, typical prior art machines of this type have load supporting wheels beneath or rearward of the mast, so that the full cargo load is cantilevered forward of these wheels. This limits the load capacities of these trucks, and requires substantial counterweights on their rear ends.

Several slip sheet lift trucks are provided with outriggers forward of the mast to reduce the loading problem mentioned above. However, these outriggers interfere with and obstruct the platen when it is to be lowered to the ground. Therefore, in order to tilt the forward end of the platen downwardly to a ground engaging loading and unloading position, one such truck jackknifes in the middle. Another has small outrigger wheels on arms which are pivoted for vertical movement between carrying and loading positions. Mechanisms such as these are complicated and expensive.

A need thus remains for an uncomplicated and inexpensive slip sheet lift truck which has the advantages of outrigger forward support without the expensive and complicated mechanisms of the prior art, and which can be equipped with a lifting mast which avoids the problems discussed above.

SUMMARY OF THE INVENTION

Briefly, the present invention meets these needs in an uncomplicated, inexpensive, highly durable and functional manner. The lift truck frame includes outriggers extending forwardly of the mast. The outriggers are underneath the platen (to avoid excessive truck width) and are in a fixed position with respect to the frame, yet do not interfere with the platen when tilted downwardly to its ground engaging position. The outriggers also provide good underclearance beneath the lift truck.

To provide these results, the fixed position outriggers extend and slope forwardly and downwardly with respect to the mast and the truck. In this way, they clear the platen while still providing good underclearance beneath the lift truck for negotiating ramps and dockboards. The platen may also include clearance openings therethrough above the outrigger wheels for additional clearance when the platen is tilted downwardly.

The present invention also includes a lifting mast which is secured to the lift truck frame in a fixed vertical position. The platen and push-pull mechanism are carried and supported on the mast for tilting movement with respect to the mast and hence the truck. More particularly, the platen and push-pull mechanism are integrally attached to a back plate. The back plate is slideably supported for sideways shifting on a tilt carriage, the side shifting of the back plate, platen, and push-pull mechanism being under the control of a sideshifter hydraulic cylinder. A pair of pivots support the tilt carriage on a lifting carriage which is supported on the mast, the pivots defining a transverse, horizontal tilting axis. A pair of tilt cylinders between the tilt carriage and the lifting carriage control tilting of the tilt carriage, back plate, platen, and push-pull mechanism about this axis. These are all moved vertically on the mast by a lifting cylinder on the lift truck which raises and lowers the lifting carriage on the mast.

Thus the mast itself does not move. Instead, the platen and push-pull mechanism are tilted with respect thereto. Since the pivots move vertically with the platen and are always on substantially the same level therewith, tilting of the platen causes essentially no longitudinal movement thereof. In addition, the entire lift truck is compact and not unduly elongated. The present invention thus provides these desirable features without the disadvantages and without the complicated and expensive mechanisms of the prior art.

It is therefore an object of the present invention to provide an improved slip sheet lift truck; a slip sheet lift truck having forwardly and downwardly extending outriggers forming part of the lift truck frame; in which a rigid lifting mast may be provided which is secured to the frame in a fixed vertical position and a platen and push-pull mechanism tiltably extend from the mast; and to provide the above objects and purposes in an economical, uncomplicated, and durable configuration.

DESCRIPTION OF THE PREFERRED EMBODIMENT

Figure 1:
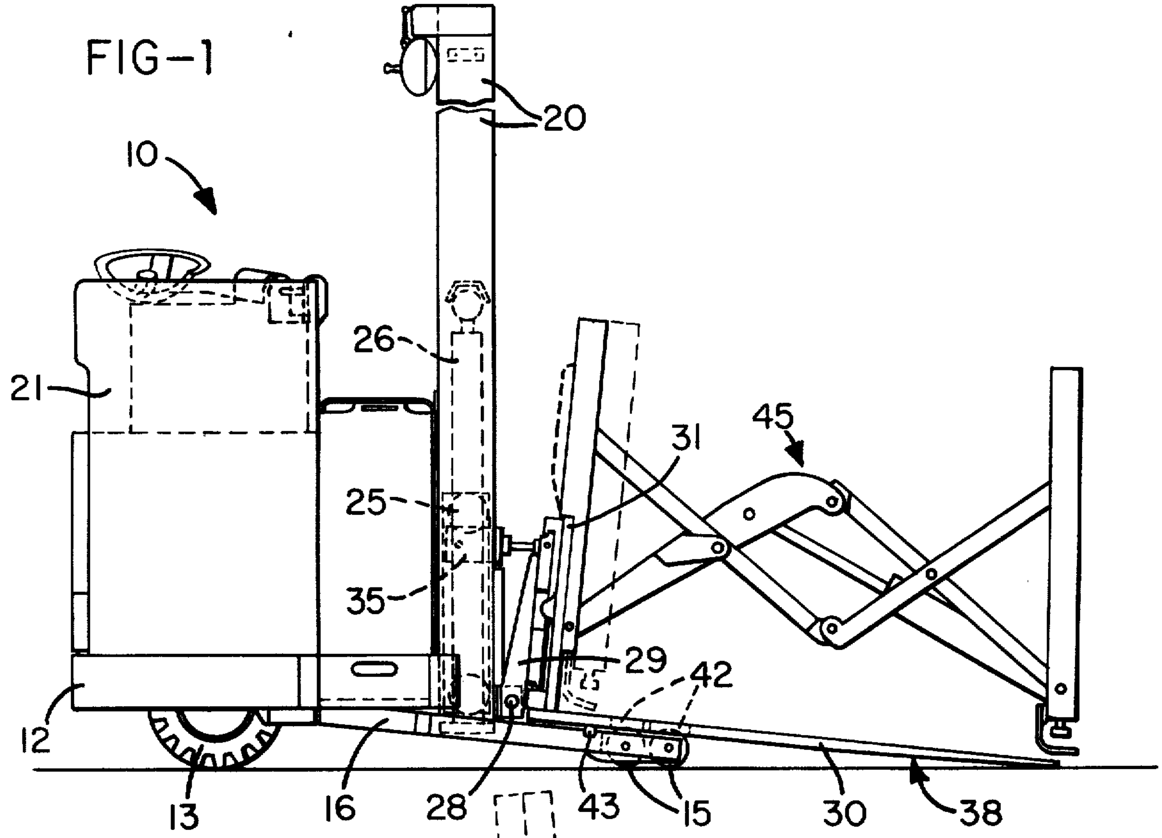
FIG. 1 is a side view of a slip sheet lift truck according to the present invention in position to pull a load from the ground onto the platen, the retracted position of the push-pull mechanism being shown in phantom.

With reference to the drawings, a slip sheet lift truck 10 according to the present invention includes a frame 12 supported at the rear on a steerable drive wheel 13 and at the front on outrigger wheels 15 on the forward ends of outriggers 16. The outriggers 16 are part of the frame 12 and extend forwardly and downwardly from a vertical lifting mast 20 which is rigidly secured to and supported upon frame 12 in a fixed position. Frame 12 also supports a lift truck body 21 rearwardly of mast 20. Body 21 encloses conventional drive and control components for truck 10.

A vertically operable lifting carriage 25 is supported on mast 20, and may be lifted by any suitable means, such as a conventional hydraulic lifting cylinder 26, for moving carriage 25 vertically along mast 20. A pair of pivots 28 pivotally support tilt carriage 29 on lifting carriage 25. A platen 30 is attached as an integral unit to a back plate 31, and plate 31 is slideably supported on tilt carriage 29 for shifting left and right (as by a hydraulic cylinder, not shown) relative to frame 12 on mast 20. The lifting carriage 25, tilt carriage 29, platen 30, and back plate 31 thus move together vertically on mast 20 when lifted or lowered by cylinder 26.

A pair of hydraulic tilt cylinders 35 is pivotally connected between tilt carriage 29 and lifting carriage 25 above pivots 28. Cylinders 35, along with pivots 28 and tilt carriage 29, comprise a tilting means which (through back plate 31) secures platen 30 to lifting carriage 25, and hence to mast 20, for tilting the platen upwardly and downwardly as tilt cylinders 35 are operated. More particularly, the platen may be tilted from a downwardly tilted or sloped ground engaging position 38 (FIG. 1) to a horizontal position 39 (FIG. 2), and to a load carrying position 40 (FIG. 2) slightly raised above the horizontal position 39. Position 40 helps assure that a load on the platen will not shift off the end, but position 39 could also serve as a raised carrying position.

The sloped ground engaging position 38 is used when the lifting carriage 25 and platen 30 have been lowered to the bottom of lifting mast 20 for pulling a load from the floor onto the platen 30 or pushing a load off the platen. The horizontal position 39 may be used for pulling and pushing loads on and off the platen 30 from elevated positions (such as when goods are stacked). As will be clear, tilting of the platen 30 between the positions 38, 39 and 40 is accomplished without requiring movement of the mast 20 or outriggers 16. Thus the center of gravity of the load does not change substantially and the position of the platen does not shift horizontally.

The sloped outriggers 16 of the present invention are particularly advantageous. They provide forward support for the load, which of course, is highly desirable. As is clear from FIG. 1, they also provide full clearance for the platen for tilting to the ground engaging position, without the need to move or adjust the outriggers themselves. Although the outriggers are thus "low" as far as the platen is concerned, adequate ground clearance beneath the truck is provided since the outriggers slope upwardly in a rearward direction, toward the truck. Beneath the mast and truck body, therefore, there is essentially no loss of clearance.

Figure 3:
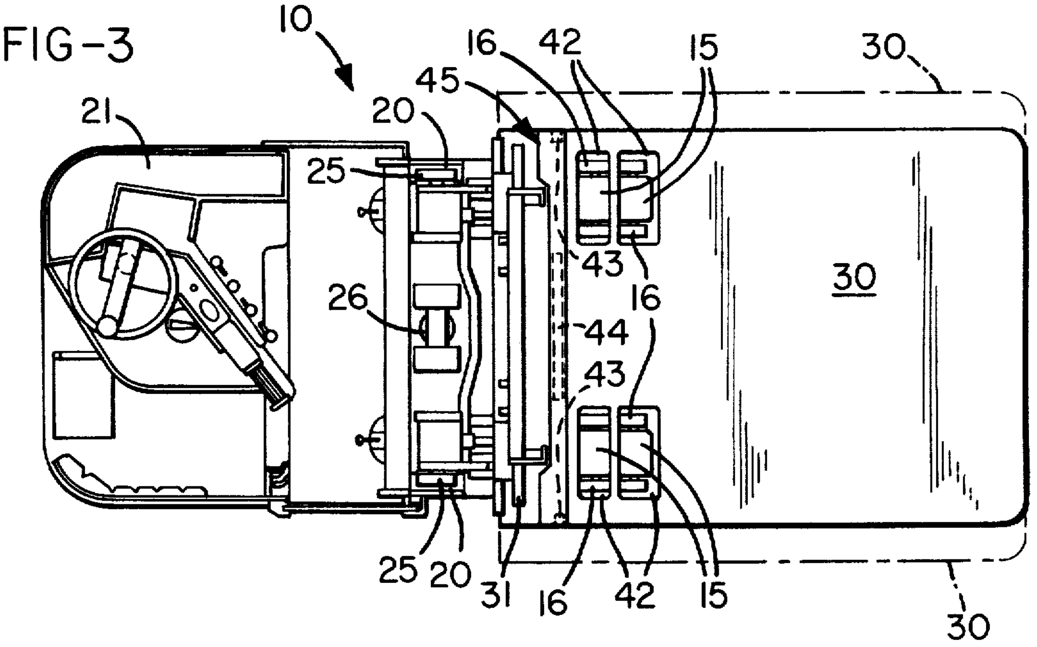
FIG. 3 is a plan view of the slip sheet lift truck shown in FIG. 1.

Since it is possible to position wheels 15 as far forward as possible, openings 42 are provided in platen 30 directly above wheels 15 to accommodate the wheels and permit the platen to be positioned as close to the ground as possible, and virtually on top of and parallel with the sloped outriggers 16, without interfering with the wheels. A pair of optional side shifter stop blocks 43 and a centrally located side shifter stop block 44 (FIG. 3) may be attached to the underside of platen 30, to limit the platen lateral travel when adjacent the outriggers 16. The stop blocks 43 and 44 extend beneath the bottom of platen 30 in positions which engage the outriggers before the platen has been fully shifted to one side or the other. If the platen has already been shifted beyond these limits while elevated, the respective blocks 43 and 44 will encounter the tops of the outriggers 16 upon lowering of the platen, to prevent full lowering thereof until it is side-shifted back toward the center.

Blocks 43 and 44 are particularly advantageous on narrow width truck designs, since the width of clearance openings 42 may then be reduced to prevent undue weakening of the platen 30, without fear of shearing off the outrigger wheels 15. Conversely, for a given size of opening 42, reduced lateral shifting in the lowermost position permits larger outrigger wheels 15 to be used. Since these wheels are subjected to heavy wear, it is desirable to use large, wide wheels.

In order to pull loads on and off of platen 30, a push-pull mechanism 45 is carried on back plate 31 and attached thereto as a part of the integrated structure defined by back plate 31 and platen 30. The push-pull mechanism 45 thus tilts and moves with platen 30 as it is tilted about pivots 28 by tilt cylinders 35 and as it is raised and lowered on mast 20. A suitable push-pull mechanism is shown in U.S. Pat. No. 3,640,414 (issued Feb. 8, 1972), and reference is made thereto for a more detailed description of mechanism 45.

Figure 2:
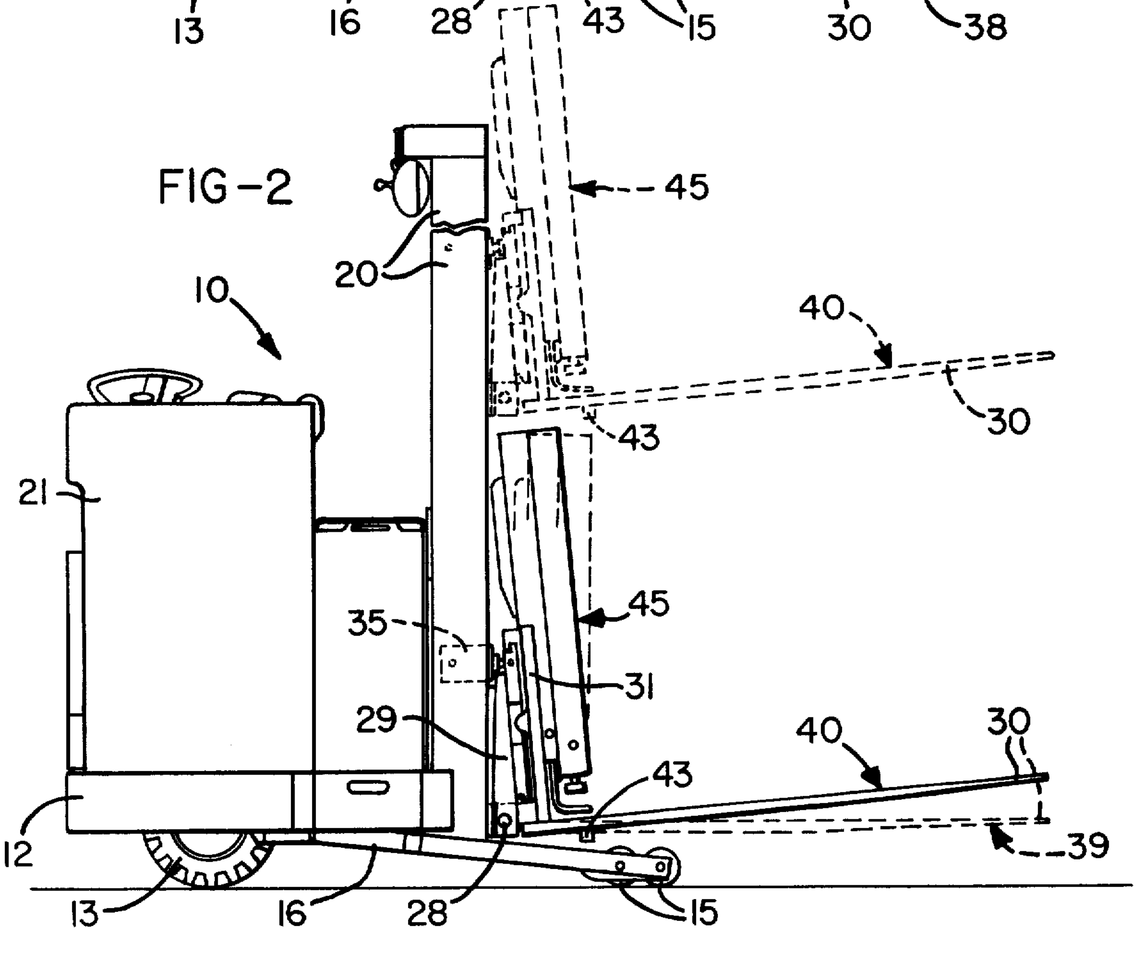
FIG. 2 is a view similar to FIG. 1 showing the platen tilted back to a load carrying position elevated slightly above horizontal, the horizontal position being shown in phantom, and a raised position near the top of the lifting mast also being shown in phantom.

As may be seen, therefore, the present invention provides numerous advantages. The mechanism is straightforward and uncomplicated. The mast itself is simplified since it is secured in a fixed position. Further, the present invention keeps the truck length to a minimum while providing substantial load support without excessive counterbalance weights in the lift truck, through the use of the forwardly extending load supporting outriggers 16. However, the present outriggers do not require complicated machinery for adjusting the lift truck so that platen 30 can be tilted to a sloped ground engaging loading position (FIG. 1). Rather, the outriggers extend and slope forwardly and downwardly at the same angle (which in the preferred embodiment is 6°) to which the platen is tilted when in the ground engaging loading position. Thus, although the outriggers are positioned beneath the platen, they do not interfere with it. At the same time, however, sufficient clearance is maintained underneath the lift truck frame to provide for negotiating ramps and dockboards. The result is a compact, uncomplicated, inexpensive, functional and versatile slip sheet lift truck which is free from the disadvantages of prior art machines. The present invention is readily adaptable to many lift truck configurations, in which, for example, the outrigger downward slope might be increased or decreased by several degrees, as appropriate. Likewise, although a solid platen has been shown and described, the term is intended to cover such variations as a platen "split" down the middle and thereby characterizable as forks.

Thus, while the form of apparatus herein described constitutes a preferred embodiment of this invention, it is to be understood that the invention is not limited thereto, and that changes may be made therein without departing from the scope of the invention.

What is claimed is:

1. A slip sheet lift truck comprising:

(a) a frame, (b) said frame including ground engaging outriggers each extending forwardly and sloping downwardly from the front of the lift truck in a fixed position with respect to said frame and the ground, (c) a platen, (d) tilting means securing said platen to said frame for tilting said platen upwardly and downwardly with respect to said frame between a sloped ground engaging loading position and a raised carrying position, said forwardly and downwardly sloping outriggers thereby providing clearance for said platen when tilted downwardly to said sloped ground engaging position, and (e) a push-pull mechanism carried on the lift truck with said platen for pulling and pushing a load onto and off said platen, said push-pull mechanism tilting and moving with said platen when tilted by said tilting means.

2. The lift truck of claim 1 further comprising load supporting wheels on the forward ends of said outriggers and beneath said platen, and means providing clearance openings through said platen for said wheels when said platen is lowered and tilted to its ground engaging position.

3. The lift truck of claim 2 further comprising:

(a) means for shifting said platen laterally a predetermined distance with respect to said frame, and (b) means for limiting the lateral shifting of said platen to less than said predetermined distance when said platen is lowered and tilted to its ground engaging position.

4. The lift truck of claim 1 wherein said tilting means further comprises:

(a) pivot means pivotally securing said platen to said frame, and (b) actuating means connected between said frame and said platen for rotating said platen about said pivot means to tilt said platen.

5. The lift truck of claim 1 further comprising a rigid lifting mast secured to said frame in a fixed vertical position.

6. The lift truck of claim 5 wherein said tilting means further comprises:

(a) a carriage supported on said mast for vertical movement thereon, (b) pivot means pivotally securing said platen to said carriage, and (c) actuating means connected between said carriage and said platen for rotating said platen about said pivot means to tilt said platen.

7. The lift truck of claim 6 wherein said actuating means is at least one hydraulic cylinder connected between said carriage and said platen above said pivot, and further comprising means for raising and lowering said carriage on said lifting mast.

8. A slip sheet lift truck comprising:

(a) a frame, (b) a rigid lifting mast secured to said frame in a fixed vertical position, (c) said frame including ground engaging outriggers extending forwardly and sloping downwardly from the mast and lift truck in fixed positions and with substantially a 6° downward slope with respect thereto, (d) a lifting carriage supported on said mast for vertical movement thereon, (e) means for raising and lowering said lifting carriage on said lifting mast, (f) a platen, (g) pivot means pivotally securing said platen to said lifting carriage, and hence to said mast, (h) hydraulic cylinder means connected between said lifting carriage and said platen above said pivot means for rotating said platen about said pivot means for tilting said platen upwardly and downwardly between a sloped ground engaging loading position and a raised carrying position without requiring movement of said mast or outriggers, (i) load supporting wheels on the forward ends of said outriggers, and beneath said platen, (j) means providing clearance openings through said platen for said wheels when said platen is lowered and tilted to its ground engaging position, (k) means for shifting said platen laterally a predetermined distance on said lifting carriage, (l) stop blocks extending downwardly from the underside of said platen to engage said outriggers upon lateral shifting of said platen to limit the lateral shifting thereof to less than said predetermined distance when said platen is lowered and tilted to its ground engaging position, and (m) a push-pull mechanism carried on the lift truck with said platen for pulling and pushing a load onto and off said platen, said push-pull mechanism tilting and moving with said platen when tilted by said tilting means.

* * * * *